United States Patent [19]

Mervyn

[11] 3,879,378

[45] Apr. 22, 1975

[54] CHEMICAL PROCESS FOR THE PRODUCTION OF HYDROXOCOBALTICORRINOIDS

[76] Inventor: Leonard Mervyn, 34 Roker Park Ave., Ickenham, England

[22] Filed: Dec. 15, 1972

[21] Appl. No.: 315,566

[30] Foreign Application Priority Data
Dec. 17, 1971 United Kingdom............... 58740/71

[52] U.S. Cl. ............................................ 260/211.7
[51] Int. Cl............................................ C07d 55/62
[58] Field of Search....................... 260/211.7, 211.5

[56] References Cited
UNITED STATES PATENTS

| | | | |
|---|---|---|---|
| 3,213,082 | 10/1965 | Smith et al....................... | 260/211.5 |
| 3,414,561 | 12/1968 | Boige............................... | 260/211.7 |

OTHER PUBLICATIONS
Royals, E. E.; Adv. Org. Chem., 1954, pp. 139-144, and 337-342, Prentice-Hall Inc., Englewood, NJ.

*Primary Examiner*—Johnnie R. Brown
*Assistant Examiner*—Cary B. Owens
*Attorney, Agent, or Firm*—Bacon & Thomas

[57] ABSTRACT

Hydroxocobalticorrinoids such as hydroxocobalamin are prepared by reaction under non-oxidising conditions and in the absence of light of a cobalt(I) corrinoid with an alkylating agent to introduce at the cobalt atom of the corrinoid a straight aliphatic chain having up to 4 carbon atoms and carrying a terminal cyclic group; and subsequent oxidation of the intermediate so formed to the corresponding hydroxocobalticorrinoid.

10 Claims, No Drawings

CHEMICAL PROCESS FOR THE PRODUCTION OF HYDROXOCOBALTICORRINOIDS

This invention is concerned with improvements in or relating to the preparation of hydroxocobalamin (vitamin $B_{12b}$) and other hydroxocobalticorrinoids.

In the manufacture of cobalamins by fermentation the substance normally isolated is cyanocobalamin. It has recently appeared however that hydroxocobalamin may be preferred to cyanocobalamin for medical application due to its superior retention in the body as shown by higher plasma levels. Furthermore, in cyanide detoxication, the hydroxo compounds are greatly superior. Similarly, hydroxo analogues of other cyanocobalticorrinoids are of interest in specific medical applications. The direct production of hydroxocobalamin from fermentations however gives rise to difficulties, particularly with regard to the isolation of the substance from the fermentation medium so that it is preferable first to produce cyanocobalamin and thereafter convert this into hydroxocobalamin. Other hydroxocobalticorrinoids may similarly be produced via their intermediate cyano analogues.

It has previously been proposed to convert cyanocobalamin into hydroxocobalamin by reduction, either by hydrogenation or by chemical reduction followed by reoxidation, but such methods give rise either to relatively poor yields or to impure products, the oxidation being accompanied by undesirable degradation. It has also been proposed to effect the desired conversion by exposing cyanocobalamin to visible light under slightly acidic conditions accompanied by aeration. This conversion is however slow and unsuitable for application on the commercial scale. Undesirable degradation also tends to take place. A further process, described in British Pat. No. 974284, gives very high yields of hydroxocobalamin but utilises severed process stages and is relatively slow.

It is thus an object of the present invention to provide an improved process for the conversion of cyanocobalticorrinoids into hydroxocobalticorrinoids and in particular of cyanocobalamin into hydroxocobalamin, which is convenient to use on the commercial scale and which is attended by less risk of degradation.

In the conversion of a cyanocobalticorrinoid into its hydroxo analogue one problem is removal of the released cyanide ions to prevent partial re-formation of the cyanocobalticorrinoid. At an acid pH, hydrogen cyanide can be removed by sparging with gas and this is the method used in the process according to British Pat. Specification No. 974284. The cyano group is also readily removed from cyanocobalticorrinoid by reduction of the cobalt to the cobalt(I) or cobalt(II) state and trapping the cyanide ions as an inert complex. A process of this type is described in Belgian Pat. Specification No. 759614.

For convenience, vitamin $B_{12}$, as well as certain of its analogues in which the molecule has been modified, have sometimes been referred to by the generic name 'cobamides'. However, cobamide is more properly only used in connection with the particular nucleus occuring in vitamin $B_{12}$ (cyanocobalamin) and it is preferably to use terminology based on corrin. Compounds containing this nucleus are known as corrinoids and the term cobalticorrinoids is used for corrinoids containing a cobalt (III) atom. (Biochim. Biophys. Acta 117 (1966) 285–288).

The term cobalt(I)-corrinoids is used herein for the corresponding compounds produced when cobalticorrinoids are reduced to the monovalent Co(I) oxidation state.

Belgain Pat. Specification No. 759614 describes and claims a method for the removal of free cyanide ions occurring in an alkaline solution of a cobalt(I) corrinoid, formed by reduction of a corresponding cyano cobalticorrinoid, wherein a cyanide-complexing agent is provided in said alkaline solution so that the cyanide ions are incorporated into a complex and are no longer able to interfere in subsequent reactions of the cobalt(I) corrinoid with other reagents.

Using this method it is possible to produce vitamin $B_{12}$ coenzyme and other cobalticorrinoid analogues thereof by reacting the reduced cobalt(I) corrinoid with an alkylating, aralkylating, acylating or sulphonylating agent. It has now been found that hydroxocobalamin can be produced by the oxidation of such analogues.

A problem in such production of hydroxocobalticorrinoids is that air-oxidation of the above analogues causes a considerable amount of degradation of the corrin nucleus. In order to avoid such degradation of the corrin nucleus on oxidation, various derivatives of the vitamin $B_{12}$ coenzyme type were investigated by reacting the cobalt(I) corrinoid with alkylating or aralkylating agents and then oxidising the Co(III)-alkyl or -aralkyl derivative. It was found that many Co(III) hydrocarbyl compounds, e.g. methylcobalamin, yield a hydroxocobalticorrinoid an oxidation but the reaction requires irradiation to achieve a good yield in a reasonable time and does not give a commercially satisfactory result in that too much degradation takes place. Such derivatives are, in fact, too stable to be readily oxidised to the hydroxo analogue in the absence of light or other irradiation. On the other hand, heavily branched alkyl groups such as t-butyl groups cannot be introduced because of steric hindrance of the cobalt atom by the corrin nucleus. It is however possible to achieve a very efficient oxidation to hydroxycobalticorrinoid by choosing an unstable corrinoid derivative susceptible to oxidation with molecular oxygen in the absence of irradiation. In order for such derivatives to exist, it is necessary that the Co-attached grouping introduced in place of CN should possess a particular molecule "shape," namely narrow at the point of attachment to the cobalt atom, but more bulky further from the cobalt atom to enhance instability. Research has shown that certain substituted alkyl groups possess the correct steric configuration to provide derivatives which are stable enough to be handled in solution but sufficiently unstable to be so readily oxidised to the hydroxo analogues that serious degradation of the molecule does not occur before the oxidation is complete.

According to the present invention, there is provided a process for the preparation of a hydroxycobalticorrinoid comprising reaction under non-oxidising and light-free conditions of a cobalt(I) corrinoid with an alkylating agent to introduce at the cobalt atom of the corrinoid a straight aliphatic chain having up to 4 carbon atoms and carrying a terminal cyclic group; and subsequent oxidation of the intermediate so formed to the corresponding hydroxocobalticorrinoid.

The terminal cyclic group in the group introduced by by the alkylating agent is desirably a mono- or polycyclic aryl or cycloalkyl group which may optionally carry substituents, preferably in positions not adjacent to the aliphatic chain, e.g. the meta and para positions of a phenyl group. The terminal cyclic group may thus be, for example, a phenyl, naphthyl or cyclohexyl group. Such cyclic groups may, as indicated above, be unsubstituted or may carry, for example, one or more alkyl, acylamido, acyloxy, ether, carboxyl, esterified carboxyl, or nitro groups or halogen atoms. In general o-substituents are not desirable, especially when the aliphatic chain is short, e.g. methylene, as the steric relationship with the corrin nucleus is adversely affected.

The aliphatic chain itself is preferably kept as short as possible. It may be unsubstituted or it may optionally carry a keto group. The aliphatic chain may thus, for example, be a methylene, ethylene, 2-ketoethylene or carbonyl group.

Particular terminally substituted aliphatic groups of use in the process are benzyl, phenethyl, benzoylmethyl, 4-nitrobenzyl, 4-nitrobenzoyl and naphth-2-oylmethyl groups and thus the alkylating agent should desirably be one which introduces one of these groups.

Thus a cobalt(I) corrinoid such as fully reduced cobalamin may be reacted with a reagent which introduces such a substituted alkyl group and the intermediate so formed may be oxidised to form a hyroxocobalticorrinoid in excellent yield and purity. More particularly, a cyanocobalticorrinoid, such as cyanocobalamin, may be fully reduced in the presence of a cyanide-complexing agent whereby free cyanide produced reacts to form an inert complex and the reduced cobalt (I) corrinoid is reacted with the alkylating reagent to form the substituted alkyl cobalticorrinoid which is then oxidised, e.g. by a source of gaseous oxygen, such as air, to form the desired hydroxocobalticorrinoid e.g. hydroxocobalamin.

It should be noted that the reaction of the complexing agent with the cyanide ions should take place under alkaline conditions to avoid decomposition of the cyanide complex and also to increase the stability of the cobalt(I) corrinoid. The reduction of the cyanocobalticorrinoid is therefore preferably effected under alkaline conditions but it is also possible to reduce the cyanocobalticorrinoid under acid conditions and then to make the solution alkaline so that the complexing agent can function.

The cyanide-complexing agent preferably contains a cyanide-complexing metal such as silver, zinc, cadmiun, mercury, chromium, molybdenum, tungsten, manganese, nickel, cobalt, iron or copper, particularly copper (II) or iron (II), and is preferably a salt of said metal, e.g. a sulphate, nitrate or halide salt. Under alkaline conditions, the complexing agent will normally be a hydroxide of the metal in equilibrium with ions of the metal concerned. Naturally the complexing agent must not be rendered ineffective by, nor interfere with, the reducing agent, if the complexing agent is to be provided in the solution before or simultaneously with the reducing agent. Furthermore, the said salt should preferably not contain anions which form stable cobalticorrinoid derivatives e.g. nitrite or sulphite ions, since these will compete in the same way as cyanide ions.

The reducing agent of choice is a complex metal hydride reducing agent and especially a borohydride e.g. an alkali metal borohydride, for example sodium, potassium or lithium borohydride. Alternatively low-valency metal ion reducing agents, for example chromous salts such as chromous acetate, or other reducing agents for example zinc and acetic acid or hydrogen in the presence of a catalyst, for example platinum, may be used.

Preferred complexing agents are provided by cupric salts such as cupric chloride and ferrous salts, for example ferrous sulphate. It is preferred to provide at least a stoichiometric quantity of the complexing reagent and an excess may often be advantageous. Cupric ions catalyse the reduction of cobalticorrinoids by borohydrides and some other reducing agents and are therefore especially useful and may advantageously be added in excess of the stoichiometric quantity required to complex the cyanide. The reduction is preferably effected in an inert solvent for the reactants, advantageously a polar solvent, for example water, an alkanol such as methanol or ethanol or substituted amide solvent such as dimethylformamide or dimethylacetamide. The metal salt providing the complexing agent is therefore preferably one soluble in the above types of solvent.

The cyanide liberated tends to compete with the alkylating reagent and it is thus necessary to add the complexing agent at the same time as, or preferably before, the alkylating reagent. It is usually more convenient to add to complexing agent before or simultaneously with the reducing agent so that the cyanide ions may be removed from solution as they are released. In a preferred embodiment of the process according to the invention, sodium borohydride is added to an aqueous solution of a cyanocobalticorrinoid containing cupric chloride or ferrous sulphate, and the alkylating reagent added subsequently on completion of the reduction.

The alkylating reagent may, for example, be of the type described in British Pat. Specification NO. 963373. Thus, for example, the reagent may be represented by the general formula RX in which X is an anion-forming substituent and R is the terminally substituted aliphatic group of the above-mentioned type, such as an unsubstituted benzyl group, a phenethyl group, a naphthyl group, a benzoyl group or a naphthoyl group. The alkylating reagent may also, for example be an alkene carrying a double bond in the 1-position, e.g. styrene which introduces a phenethyl group.

The substituent X may for example be a halogen atom e.g. chlorine, bromine or iodine atom, or a radical derived from a strong inorganic or organic acid, for example a sulphate or phosphate group or an alkyl-, aralkyl- or aryl-sulphonate group, e.g. a methylsulphonate or p-tolylsulphonate group, or an oxalate group.

The terminally substituted aliphatic chain may also be an alkenyl group having 2–4 carbon atoms. These alkenyl substituents may be introduced using reagents analogous to those used to introduce alkyl substituents. Thus an alkenyl group with a terminal double bond (e.g. a styryl group) may be introduced using the corresponding alkynyl reagent (e.g. phenylacetylene). An alkenyl group may also be introduced using the corresponding alkenyl halide, or using the corresponding enyne or diene compound. Thus the 4-phenylbut-3-enyl group may be introduced using 1-chloro-4-phenylbut-3-ene and the 4-phenylbuta-1,3-dienyl group may be introduced using 4-phenylbut-3-en-1-yne.

In order to ensure that the starting material is not reoxidised before it is desired, the reaction should be effected under non-oxidising conditions and in the absence of light. The overall reaction proceeds best at relatively high concentration, preferably using nearly saturated solutions of the starting cyanocobalamin, e.g. about 3.3 g/100 ml water. The optional concentration of reducing agent will depend upon the nature of the reagent but, for example, sodium borohydride is preferably used in the concentration range 0.05 g to 1.00 g/100 ml most preferably at relatively high concentrations. Where a complexing agent is used this may be present in comparatively small quantities and for example 0.35 g/100 ml of ferrous or cupric salts are advantageous.

It is necessary during the process to separate the corrinoids from the salts present and although this may be effected at any stage after the reduction it is desirably effected immediately after the alkylation step. Any convenient de-salting technique may be used such as phenol extraction or adsorption onto a resin. The resin adsorption method is preferred and it is particularly convenient to use a cross-linked polystyrene resin such as XAD-2 resin, sold by the Rohm and Haas Co. of Philadelphia, U.S.A. Alternatively such a resin carrying carboxyl groups, e.g. the IR or IRC resins also sold by Rohm and Haas may be used but the neutral resins are preferred. The salts may be washed off with water and then the corrinoids may be eluted with, for example, water mixed with a water-miscible solvent, e.g. a ketone such as methylethyl ketone or, more preferably, acetone, or an alcohol such as methanol or ethanol; 60:40 aqueous acetone is preferred.

The use of XAD-2 resin to desalt the reaction mixture can lead to complications where a cyanide complex is present. Some inherent acidity in the resin liberates cyanide which leads to re-conversion of hydroxocobalticorrinoid to cyanocobalticorrinoid. This can be overcome by first washing the resin with alkali.

Where phenolic desalting is used the phenol, e.g. hydroxybenzene itself, is preferably mixed with a nonpolar water-immiscible organic solvent e.g. chloroform, carbon tetrachloride or ether, to reduce the solubility of the cobalamin in the phenol when the phenol is washed finally to extract the cobalamin; the water for this extraction advantageously contains a water-miscible solvent for cobalamins as in the elution from resin referred to above.

The solution of the cobalticorrinoids obtained after desalting is then subjected to oxidation, preferably by aeration, until conversion into hydroxocobalticorrinoid is complete. This stage need not be carried out in the dark since there is no longer any need to prevent decomposition.

Separation of the corrinoid products may be effected on ion-exchange media. Thus anionic ($OH^-$) DEAE-cellulose will retain by-products such as so-called red acids which can be eluted with dilute alkali. Subsequent treatment with cationic ($H^+$)CM— cellulose retains hydroxocobalticorrinoids but allows unchanged cyanocobalticorrinoids to be eluted with water. The form the desired hydroxo product will take depends of course on the pH of the system. At a pH of above about 10 the product will exist as a hydroxocobalticorrinoid; at a pH below about 4 the basic aquocobalticorrinoid form is obtained instead while at a pH in between 4 and 10 an equilibrium mixture occurs.

The desired hydroxocobalticorrinoids may thus be eluted with dilute acid, e.g. N/50 hydrochloric acid or N/25 acetic acid in the form of aquocobalticorrinoids and finally isolated by crystallisation if desired after evaporation or addition of a precipitant such as acetone.

One particular advantage of the process according to the present invention is that it proceeds by using intermediates common to the process of Belgian Pat. No. 759614 for the production of vitamin $B_{12}$ coenzyme and related Co (III)-derivatives. Thus a cyanocobalticorrinoid, e.g. cyanocobalamin, may be reduced and the cyanide removed and the cobalt (I) corrinoid produced then forms a common intermediate both for the preparation of cobalticorrinoids, e.g. vitamin $B_{12}$ coenzyme and other analogous derivatives and also for hydroxocobalticorrinoids, e.g. hydroxocobalamin. The following Examples further illustrate the invention:

EXAMPLE 1

Cyanocobalamin (9.4 g) was dissolved with magnetic stirring in water (300 ml) in a 3-necked litre r.b. flask. Cupric chloride (1.5 g) was dissolved with the cobalamin. One neck of the flask was connected via a tap to a water pump. The others held a separating funnel and a glass sparger connected to a nitrogen cylinder via a tap. Oxygen was removed from the solution by alternately applying a vacuum with the water pump then saturating the solution with nitrogen. After five such cycles the nitrogen source was shut off and the flask held at a negative pressure. Meanwhile, sodium borohydride (2 g) was dissolved in water (20 ml) and the solution was transferred to the separator. Nitrogen was bubbled through the solution for 5 minutes to remove oxygen. The solution was slowly sucked into the reaction flask over about 5 minutes until 0.5 ml was left behind. Then the tap was closed. After this addition, nitrogen was re-connected to the sparger and the tap to the water pump was left open. Reduction was allowed to continue for 15 minutes by which time the colour of the solution was green.

Light was then excluded from the reaction flask before the next addition was made. Benzyl chloride (5 ml) in methanol (10 ml) was introduced into the separator and added over a period of 5 minutes to the reduced cobalamin. A further 10 minutes were allowed to complete the reaction then air was introduced into the flask. The resulting solution of benzylcobalamin was kept dark and processed as follows:

The mixture was filtered through a Buchner funnel and the retained precipitate was washed with water. The combined filtrate and washings were then loaded onto an XAD-2 column (500 ml resin) previously washed with methanol/hydrochloric acid, water and N/10 caustic soda. The column and feed were kept dark but no such precautions were taken with the eluates. When the benzylcobalamin was wholly adsorbed onto the column, the resin was washed with water until all the salts had been eluted. Aqueous acetone (60:40) was then used to elute the cobalamins completely. This eluate was transferred to a large Buchner flask and air was sucked through it for eight hours. During this time the colour of the solution changed from a cherry red to a brown red, characteristic of hydroxocobalamin. When the solution no longer turned yellow on acidification, conversion from benzylcobalamin to hydroxocobalamin was considered complete. At this stage the solution was rotary evaporated to a concentration of about 5%.

The salt-free cobalamin solution was run through a DEAE-cellulose (OH⁻) column (200 ml) after being acidified to pH 3.0. The effluent from this column was then run through to CM-cellulose (H+) column (200 ml) which retained hydroxocobalamin but allowed unchanged cyanocobalamin to be eluted with water. Hydroxocobalamin was eluted from the cationic cellulose with N/50 hydrochloric acid to yield a solution of aquocobalamin chloride. Acetone was added to this solution until a faint opalescence persisted and aquocobalamin chloride was allowed to crystallise. 8.3 was obtained indicating a yield of 88.2% and a purity of >97%. 0.40 g cyanocobalamin was recovered.

EXAMPLE 2

Cyanocobalamin (10 g) was dissolved in water (400 ml) together with cupric sulphate (2.0 g). Reduction was then carried out exactly as described in Example 1, and benzylcobalamin was produced in the same manner. The reaction mixture containing benzylcobalamin was filtered through a Buchner funnel and the washings combined with the filtrate a produce a volume of 500 ml. The solution was transferred, still in the absence of light, to a separating funnel and extracted three times with a 3:1 phenol/chloroform mixture (100 ml). The combined phenol/chloroform extracts (300 ml) were washed with water (100 ml) until the pH of the washings was neutral. Acetone (300 ml), water (150 ml) and diethyl ether (600 ml) were added to the extract and shaken when the cobalamins were extracted into the water. Two further extractions with water (100 ml each) were carried out and the combined aqueous extracts were washed twice with one-half volume diethyl ether.

The salt-free aqueous solution of benzylcobalamin was then aerated as described in Example 1. Treatment of the resulting hydroxocobalamin was carried out as in Example 1 and it was adsorbed onto GM-cellulose as described.

Elution from CM-cellulose was carried out with N/25 acetic acid to yield aquocobalamin acetate which was crystallised by addition of acetone. Weight of crystalline aquocobalamin acetate = 9.2 g. Remaining cyanocobalamin = 0.38 g. In Examples 3 to 7 intermediates other than benzylcobalamin were made. The techniques of reduction, reaction, desalting, aeration and isolation of hydroxocobalamin were as described in Example 1, except that benzyl chloride was replaced by other reagents. The results are shown in the following table in which $CNB_{12}$ indicates cyanocobalamin and $OHB_{12}$ indicates hydroxocobalamin. The amount of reagent used is indicated in the table.

|  | Reagents | Time of reaction (mins) | Time of aeration (hrs) | Recovered CH $B_{12}$ | Weight of CH $B_{12}$ | Yield (%) | Purity (%) |
|---|---|---|---|---|---|---|---|
| Ex. 3 | 4-nitrobenzyl bromide (a) | 20 mins | 16 hrs | 0.08 g | 8.22 g | 82.2 | 97 |
| do. 4 | 4-nitrobenzoyl chloride (a) | 20 mins | 16 hrs | 0.50 g | 6.96 g | 69.6 | 97 |
| do. 5 | Styrene (b) | 240 mins | 8 hrs | 0.45 g | 5.67 g | 56.7 | 94 |
| do. 6 | 2-bromoacetaphenone (a) | 30 mins | 16 hrs. | 0.20 g | 8.30 g | 83.0 | 98 |
| do. 7 | 2-bromo-2'-acetonaphthone (a) | 60 mins | 16 hrs | 0.22 g | 7.55 g | 75.5 | 98 |

10 g cyanocetalamin was taken in each case
(a) indicates 5 g reagent used in 10 ml methanol.
(b) indicates 5ml reagent used in 10 ml methanol.

I claim:
1. A process for the preparation of a hydroxocobalticorrinoid consisting essentially of:

a. reacting under non-oxidising and light-free conditions a cobalt (I) corrinoid with a reagent of the formula RX, wherein:

R represents a straight aliphatic chain having up to 4 carbon atoms having a terminal cyclic group selected from the group consisting of mono- and bi-cyclic aryl and cyclohexyl groups and mono- and bi-cyclic aryl and cyclohexyl groups carrying in positions not adjacent to the aliphatic chain substituents selected from the group consisting of alkyl, acylamido, acyloxy, ether, carboxyl, carboxylic ester and nitro groups and halogen atoms; said cyclic group having a bulk at least as great as phenyl whereby a cobalt corrinoid derivative is formed which is stable enough to be handled in a solution and which is sufficiently unstable to be readily oxidised to hydroxo analogues without serious degradation of the molecule before oxidation is complete, and X represents a radical derived from the anionic moiety of a strong organic or inorganic acid, or where R possess an alk-1-enyl group having 2–4 carbon atoms having a terminal cyclic group as defined above, a hydrogen atom; and b. subsequently reacting the intermediate so formed with molecular oxygen.

2. A process according to claim 1 in which the terminal cyclic group in the reagent RX is phenyl, napthyl or cyclohexyl group or a phenyl, napthyl or cyclohexyl group carrying substituents selected from the group consisting of lower alkyl, acylamido, acyloxy, ether, carboxyl, esterified carboxyl and nitro groups and halogen atoms.

3. The process according to claim 1 in which sodium borohydride is added to a solution of a cyanocobalticorrinoid containing cupric chloride or ferrous sulphate and on completion of the reduction the reagent RX is added.

4. A process according to claim 1 in which the aliphatic chain carries a keto group.

5. A process according to claim 1 in which the aliphatic chain is a methylene, ethylene, 2-ketoethylene or carbonyl group.

6. A process according to claim 1 in which the aliphatic chain carrying a terminal cyclic group is a benzyl, phenethyl, benzoylmethyl, 4-nitrobenzyl, 4-nitrobenzyl or naphth-2-oylmethyl group.

7. A process according to claim 1 in which X is a chlorine, bromine or iodine atom, a sulphate or phosphate group, an alkyl-, aralkyl- or aryl-sulphonate group or an oxalate group.

8. A process according to claim 1 in which the cobalt(I) corrinoid is obtained by reduction of a cyanocobalticorrinoid in an alkaline medium, a cyanide-complexing agent being added.

9. A process according to claim 8 in which the cyanocobalticorrinoid is cyanocobalamin.

10. A process according to claim 1 in which the oxidation is effected using a source of gaseous oxygen.

* * * * *